US009225439B2

(12) United States Patent
Hodgetts et al.

(10) Patent No.: US 9,225,439 B2
(45) Date of Patent: Dec. 29, 2015

(54) METHOD FOR MONITORING A METRIC FOR A BASE STATION'S DOWNLINK/UPLINK PATH UTILIZING A RADIO FREQUENCY SCANNER AND THE RADIO FREQUENCY SCANNER

(71) Applicant: Alcatel-Lucent USA Inc., Murray Hill, NJ (US)

(72) Inventors: Michael W. Hodgetts, Long Valley, NJ (US); Liang W. Hung, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 281 days.

(21) Appl. No.: 13/853,614

(22) Filed: Mar. 29, 2013

(65) Prior Publication Data

US 2014/0295769 A1    Oct. 2, 2014

(51) Int. Cl.
| | |
|---|---|
| *H04B 17/00* | (2015.01) |
| *H04W 24/00* | (2009.01) |
| *H04B 1/18* | (2006.01) |
| *H04B 17/17* | (2015.01) |

(52) U.S. Cl.
CPC ........... *H04B 17/0022* (2013.01); *H04B 17/17* (2013.01); *H04W 24/00* (2013.01)

(58) Field of Classification Search
USPC .......... 455/423, 424, 425, 67.11, 67.7, 115.1, 455/115.3, 115.4, 161.1, 161.2, 161.3
See application file for complete search history.

(56) References Cited

U.S. PATENT DOCUMENTS

| | | | | |
|---|---|---|---|---|
| 6,535,733 | B1* | 3/2003 | Matusevich et al. | 455/424 |
| 7,599,322 | B2* | 10/2009 | Lee et al. | 370/327 |
| 2001/0055967 | A1* | 12/2001 | Ostrup et al. | 455/423 |
| 2002/0127986 | A1* | 9/2002 | White et al. | 455/194.2 |
| 2002/0146996 | A1* | 10/2002 | Bachman et al. | 455/302 |
| 2005/0245213 | A1* | 11/2005 | Hirano et al. | 455/127.1 |
| 2014/0024402 | A1* | 1/2014 | Singh | 455/501 |

FOREIGN PATENT DOCUMENTS

WO    WO-2010/144601 A1    12/2010

OTHER PUBLICATIONS

Vucetic et al."Signal Monitoring System for Wireless Network Operation and Management", Telecommunications Symposium, 1988, pp. 296-300, IEEE, USA.*
Vucetic et al. "Signal Monitoring System for Wireless Network Operation and Management," Telecommunuications Symposium, 1998, p. 296-300, IEEE, USA.
International Search Report (PCT/ISA/210) and Written Opinion (PCT/ISA/237) for International Application No. PCT/US2014/031983 Dated Aug. 8, 2014.

* cited by examiner

*Primary Examiner* — Nguyen Vo
(74) *Attorney, Agent, or Firm* — Harness, Dickey & Pierce, P.L.C.

(57) ABSTRACT

In one embodiment, the radio frequency scanner includes a detector configured to receive signals for transmission by the base station, and to detect a presence metric for each carrier expected in the received signals. A processor is configured to determine if the base station is operating improperly based on the detected presence metrics.

17 Claims, 3 Drawing Sheets

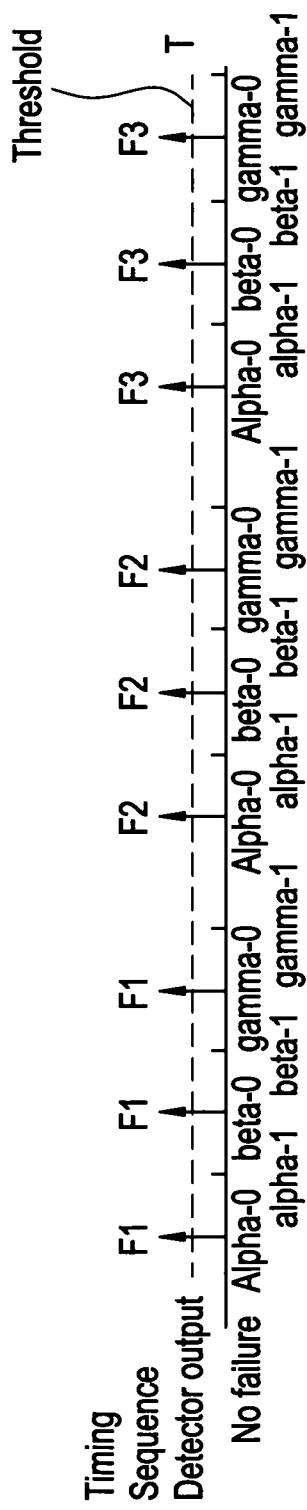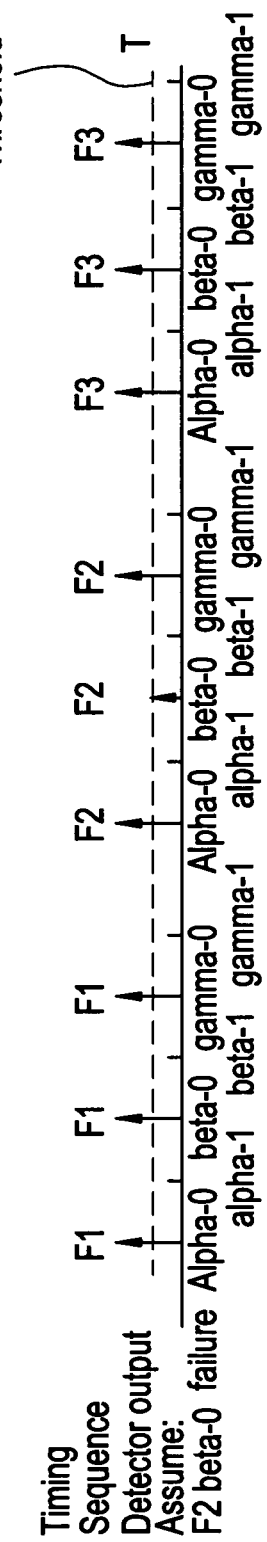

METHOD FOR MONITORING A METRIC FOR A BASE STATION'S DOWNLINK/UPLINK PATH UTILIZING A RADIO FREQUENCY SCANNER AND THE RADIO FREQUENCY SCANNER

BACKGROUND

Typically, base station diagnostics concentrate on voltage standing wave ratio (VSWR) for poor antenna connection or RF path mal-function. These widely used approaches across the industry add cost to each radio and filter. Furthermore, these approaches do not necessarily detect all issues with radio, cables/connectors, combiners or filter assemblies.

SUMMARY

At least one embodiment relates to radio frequency scanner for monitoring a base station.

In one embodiment, the radio frequency scanner includes a detector configured to receive signals for transmission by the base station, and to detect a presence metric for each carrier expected in the received signals. A processor is configured to determine if the base station is operating improperly based on the detected presence metrics.

In one embodiment, the detector is configured to receive signals coupled from output of at least one radio frequency filter prior to transmission antenna.

In one embodiment, the detector is configured to receive at least one signal corresponding to each sector associated with the base station, and the processor is configured to determine if the base station is operating improperly with respect to each sector associated with the base station.

In one embodiment, the detector is configured to receive more than one signal corresponding to each sector of the base station, and each signal corresponding to a sector is associated with a different diversity of the sector. The processor may be configured to determine if the base station is operating improperly with respect to each diversity of each sector associated with the base station.

As examples only, the presence metric may be one of average envelop power, peak power, and a combination of average envelope power and peak power.

In another embodiment, the processor is configured to determine a number of detected carriers based on the presence metrics, and the processor is configured to determine whether the base station is operating improperly based on the determined number of detected carriers and an expected number of detected carriers.

In one embodiment, the processor is configured to determine whether the base station is operating improperly based on the determined number of detected carriers for each sector associated with the base station and an expected number of detected carriers for each sector associated with the base station.

In one embodiment, the processor is configured to perform a carrier detection operation to determine if a carrier is detected, the carrier detection operation being based on the presence metric associated with the carrier and a metric threshold.

Also, in another embodiment, the processor may be configured to perform the carrier detection operation a number of times for each carrier, and the processor is configured to determine the carrier is detected if at least a threshold number of carrier detection operations produces a positive detection result.

In one embodiment, the processor is configured to generate an alarm if the processor determines the base station is operating improperly. The processor may also be configured to output the alarm from the radio frequency scanner.

In one embodiment, the processor may determine the carrier air interface type by analyzing detected envelope information In one embodiment, the processor may store carrier's traffic information as the result of carrier's RF power detection.

At least one embodiment relates to a method of monitoring a base station.

In one embodiment, the method includes obtaining signals for transmission by the base station, detecting a presence metric for each carrier expected in the obtained signals, and determining, by a processor, if the base station is operating improperly based on the detected presence metrics.

In one embodiment, the obtaining obtains the signals from output of at least one radio frequency filter prior to transmission.

In another embodiment, the obtaining obtains at least one signal corresponding to each sector associated with the base station, and the determining determines if the base station is operating improperly with respect to each sector associated with the base station.

As examples only, the presence metric may be one of average envelop power, peak power, and a combination of average envelope power and peak power.

In one embodiment, the determining determines a number of detected carriers based on the presence metrics, and determines whether the base station is operating improperly based on the determined number of detected carriers and an expected number of detected carriers.

In one embodiment, the method further includes generating an alarm if the determining determines the base station is operating improperly.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 3 illustrates an example of detector output over three frame scans for the zero diversity Div-0 of each sector.

FIG. 4 illustrates another example of detector output over three frame scans for the zero diversity Div-0 of each sector.

DETAILED DESCRIPTION OF THE EMBODIMENTS

Figure 1:
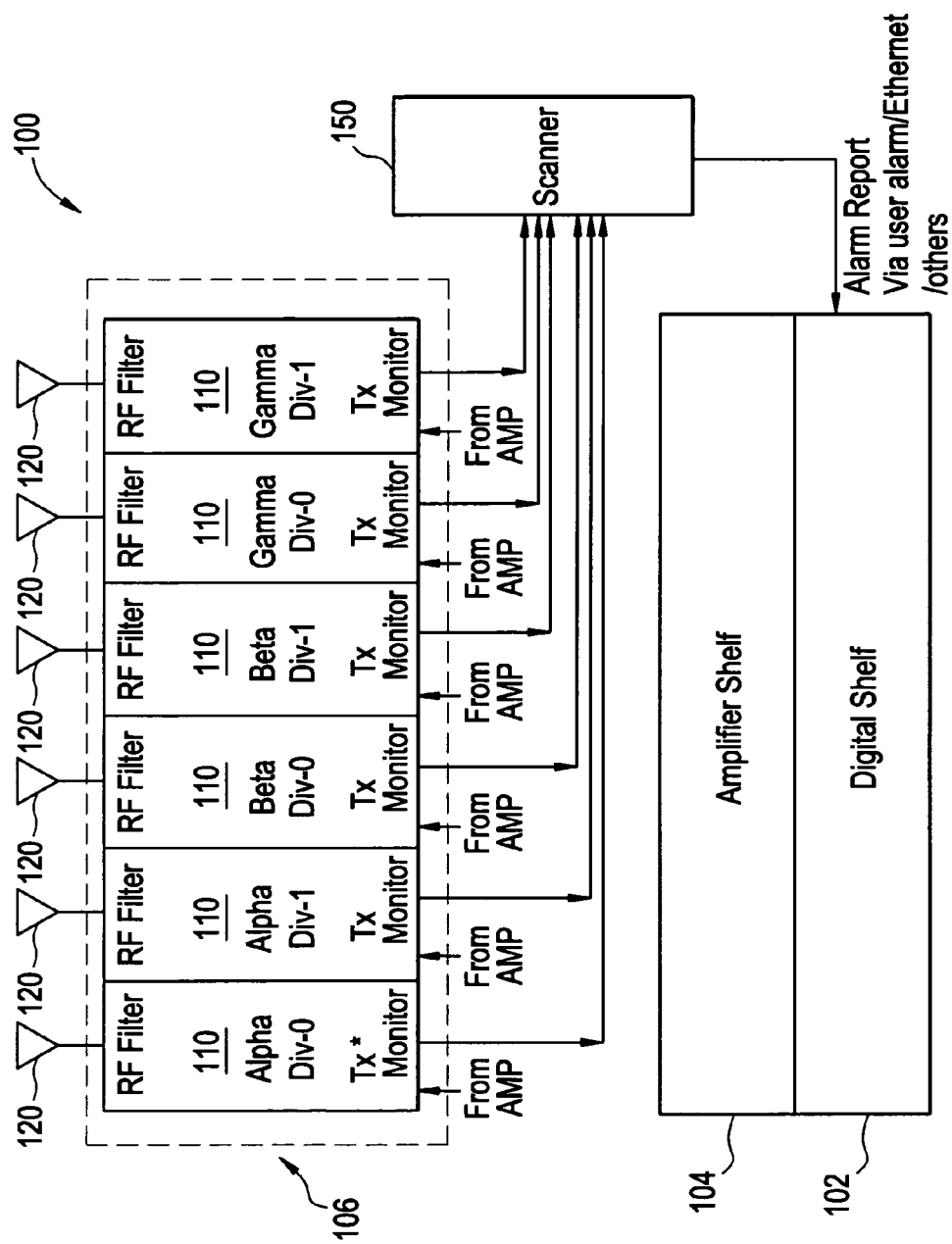
FIG. 1 illustrates a base station including a radio frequency scanner according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller or processor. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, base transceiver stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

FIG. 1 illustrates a base station including a radio frequency scanner according to an example embodiment. As shown, a base station 100 may include a digital shelf 102 with various electronics (e.g., processors, etc.) providing the functionality of the base station, an amplifier shelf 104 with various amplifiers for amplifying signals for transmission, and a filter bank 106 including a plurality of radio frequency (RF) filters 110. The filter bank 106 filters the amplified signals output from the amplifier shelf prior to transmission via respective antennas 120.

In this embodiment, the base station 100 serves a coverage area divided into three sectors. The three sectors may be referred to as Alpha, Beta and Gamma. As shown in FIG. 1, two filters 110 are associated with each sector. The two filters 110 and respective antennas 120 for each sector also provide different transmit diversity referred to as "Div-0" and "Div-1". Each filter 110 filters a respective amplified signal for transmission in a desired frequency band. The frequency bands associated with the different filters 110 may differ, and are generally prescribed by the wireless protocol or protocols supported by the base station 100. For example, the base station 100 may support one or more of 2G, 3G, 4G, etc.

According to one embodiment, a radio frequency scanner 150 may be coupled to the filters 110. For example, the filters 110 may provide coupled ports for transmission/reception monitoring, and the radio frequency scanner 150 may receive as input the coupled transmission output from the filters 110. Alternatively, external couplers that couple the signals to be transmitted as output from the filters 110 may be used to supply the input to the radio frequency scanner 150. As will be described in detail below with respect to FIGS. 2-4, the radio frequency scanner 150 determines if the base station is operating improperly, and if improper operation is determined, the radio frequency scanner 150 may issue one or more alarms and/or an alarm report. The alarm may be a message or report that the radio frequency scanner 150 provides to the electronics of the digital shelf 102. These electronics may then report the alarm to a remote operator (e.g., as one or more user alarms).

Figure 2:
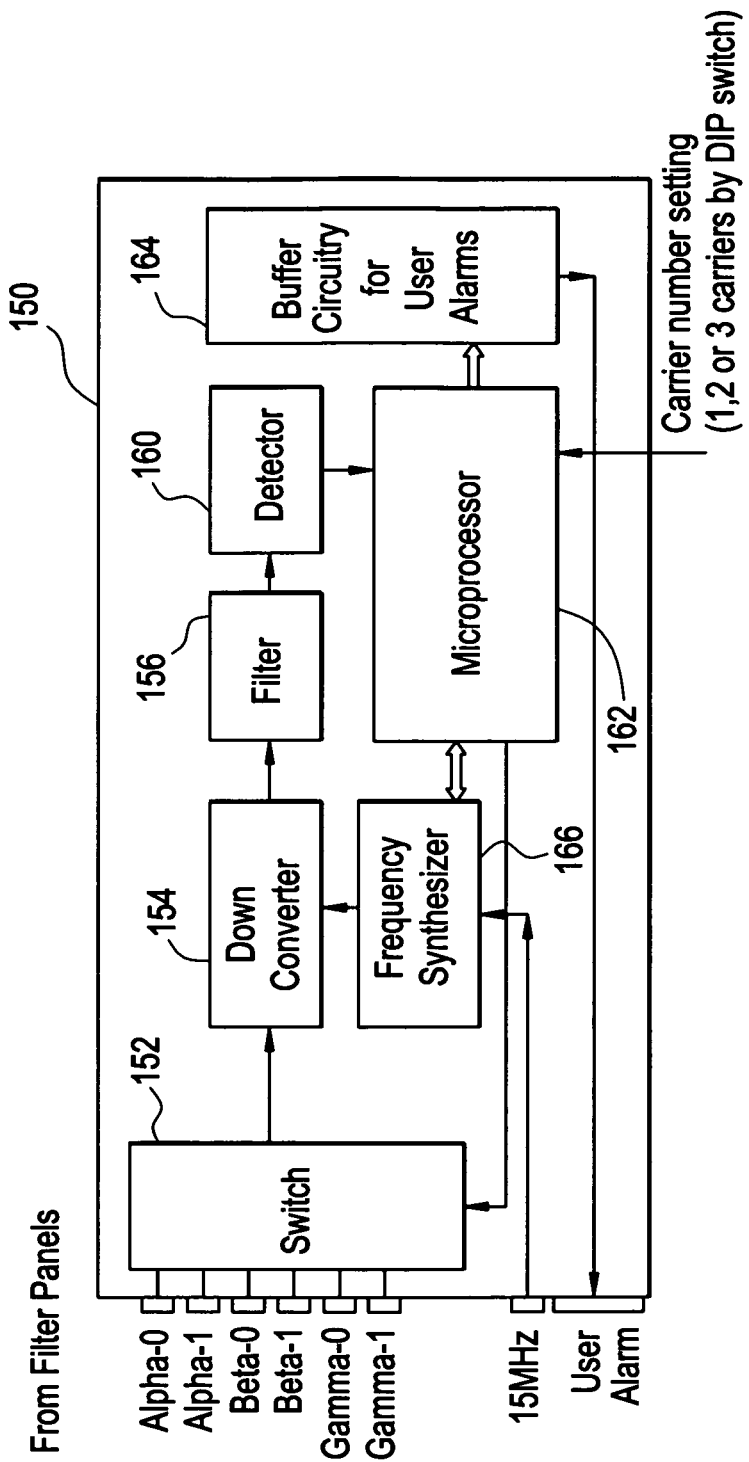
FIG. 2 illustrates a radio frequency scanner in greater detail according to an example embodiment.

FIG. 2 illustrates the radio frequency scanner of FIG. 1 in greater detail according to an example embodiment. As shown, the radio frequency scanner 150 includes a switch 152, a down converter 154, a filter 156, a detector 160, a microprocessor 162, a buffer 164, and a frequency synthesizer 166. The switch 152, under the control of the microprocessor 162, selectively outputs the signals obtained from the filters 110. The frequency synthesizer 166 receives a reference signal (e.g., a 15 MHz reference signal), and supplies a mixing signal to the down converter 154. The down converter 154 down converts the output from the switch 152 by mixing the mixing signal and the output from the switch 152. For example, the down converter 154 down converts output from the switch 152 from radio frequency to an intermediate frequency range based on output from the frequency synthesizer 166. In one embodiment, the intermediate frequency range is a preferred frequency range for the detector 160. The filter 156 filters the output of the down converter 154 to provide cleaner signals to the detector 160.

The detector 160 detects a presence metric for each carrier expected in the received signals. The presence metric may be one of average envelop power, peak power, a combination of average envelope power and peak power, etc. The processor 162 determines if the base station is operating improperly based on the detected presence metrics. For example, in one embodiment, the processor 162 determines a number of detected carriers based on the presence metrics, and the processor determines whether the base station is operating improperly based on the determined number of detected carriers and an expected number of detected carriers.

In one embodiment, the processor 162 performs a detection operation using the presence metric corresponding to the signal from each filter 110 to determine whether a carrier is detected. For instance, the processor 162 may compare the presence metric (e.g., average envelope power) to a metric threshold. If the presence metric exceeds the metric threshold, then the processor 162 determines a carrier is detected. The metric threshold may be a design parameter determined through empirical study.

As shown in FIG. 2, the microprocessor 162 may receive input from a DIP switch indicating the expected number of carriers. However, it will be understood that the microprocessor 162 may be programmed or provided with this information in any manner. Also, the microprocessor 162 may be configured to determine a number of carriers over a testing window of time, and use this determined number as the expected number during future monitoring.

As will be appreciated from FIGS. 1 and 2, through operation of the switch 152, the detector 160 receives at least one signal corresponding to each sector associated with the base station. Accordingly, the detector 160 produces at least one presence metric associated with each sector, and the processor 162 may determine if the base station is operating improperly with respect to each sector associated with the base station. Still further, in the embodiment of FIGS. 1 and 2, the detector 160 may receive more than one signal corresponding to each sector of the base station, and each signal corresponding to a sector is associated with a different diversity of the sector. Accordingly, the detector 160 produces two presence metrics associated with each sector, and each of the present metrics is associated with a different diversity. The processor 162 may determine if the base station is operating improperly with respect to each diversity of each sector associated with the base station.

FIG. 3 illustrates an example of detector output over three frame scans for the zero diversity Div-0 of each sector. As shown, a vector represents the magnitude of the presence metric in FIG. 3. Each vector is labeled with the corresponding sector and diversity (e.g., Alpha-0 for sector Alpha and diversity Div-0). Also, FIG. 3 indicates the frame scan, where F1 is the first frame scan, F2 is the second frame scan and F3 is the third frame scan.

FIG. 4 illustrates another example of detector output over three frame scans for the zero diversity Div-0 of each sector. FIG. 4 is the same as FIG. 3, except that the presence metric for sector Beta and diversity Div-0 during the second frame F2 does not meet the threshold requirement. Accordingly, the processor 162 may determine that the base station is not operating properly with respect to sector Beta and diversity Div-0.

However, as will be appreciated, numerous factors may contribute to an occasion failure to meet the detection or threshold requirement. Accordingly, to prevent falsely determining improper operation, the processor 162 may determine improper operation based on monitoring over a time period. For example, the processor 162 may perform the carrier detection operation a number of times for each expected carrier (e.g., for each diversity at each sector), and the processor 162 determines the carrier is detected if at least a threshold number of carrier detection operations produces a positive detection result. The threshold number may be 1, for example. Namely, as long as one detection operation produces a positive result, the carrier is detected. As another example, the threshold number may equal the number of detection operations. Here, if one detection operation fails, then the detection operation produces a negative result. Accordingly, the threshold number is a design parameter that may be set based on the desired sensitivity for determining improper operation. The monitoring time period may be the time to perform a number of frames (or scans), an actual time period (e.g., 8 am to 10 am), etc.

If the processor 162 determines the base station is operating improperly, the processor 162 generates an alarm or alarm report. The alarm or alarm report may indicate the base station is operating improperly, a particular sector is operating improperly, the diversity and sector that are operating improperly, and/or etc.

The processor 162 may store the alarm or alarm report in the buffer 164. Also, the processor 162 may output the alarm or alarm report directly or from the buffer 164 to the electronics of the digital shelf 102. For example, the processor 162 may be connected to the digital shelf 102 via an Ethernet cable, wirelessly (e.g., blue tooth), etc. As discussed above, the alarms or reports may then be communicated to a remoter operator.

While the example embodiments discussed above pertained to a base station with three sectors, the example embodiments are also applicable to omni-directional base stations, or base stations with any number of sectors. Further, the example embodiments are not limited to sectors with diversity or with a diversity of two. Still further, the example embodiments are applicable to any wireless standard, or base stations complying with multiple standards.

It will also be understood that the radio frequency scanner may be modified in various ways. For example, instead of a frequency synthesizer, down converter and filter, an analog-to-digital converter may be provided to convert the output from the switch 152 to digital baseband signals. In this embodiment, the processor 162 would include the detector 160 as a digital detection module executed at the processor 162.

The invention being thus described, it will be obvious that the same may be varied in many ways. Such variations are not to be regarded as a departure from the invention, and all such modifications are intended to be included within the scope of the invention.

We claim:

1. A radio frequency scanner for monitoring a base station, comprising:
    a detector configured to receive signals for transmission by the base station, and the detector configured to detect a presence metric for each carrier expected in the received signals;
    a processor configured to determine if the base station is operating improperly based on the detected presence metrics,
    wherein the processor is configured to determine a number of detected carriers based on the presence metrics, and the processor is configured to determine whether the base station is operating improperly based on the determined number of detected carriers and an expected number of detected carriers.

2. The radio frequency scanner of claim 1, wherein the detector is configured to receive signals coupled from output of at least one radio frequency filter prior to transmission.

3. The radio frequency scanner of claim 1, wherein
    the detector is configured to receive at least one signal corresponding to each sector associated with the base station; and
    the processor is configured to determine if the base station is operating improperly with respect to each sector associated with the base station.

4. The radio frequency scanner of claim 3, wherein
    the detector is configured to receive more than one signal corresponding to each sector of the base station, and each signal corresponding to a sector is associated with a different diversity of the sector; and
    the processor is configured to determine if the base station is operating improperly with respect to each diversity of each sector associated with the base station.

5. The radio frequency scanner of claim 1, wherein the presence metric is one of average envelop power, peak power, and a combination of average envelope power and peak power.

6. The radio frequency scanner of claim 1, further comprising:
    a down converter configured to down convert the received signals and supply the down converted signals to the detector.

7. The radio frequency scanner of claim 1, further comprising:
    an analog-to-digital converter configured to convert the received signals to digital baseband signals; and wherein
    the processor includes the detector.

8. The radio frequency scanner of claim 1, wherein the processor is configured to determine whether the base station is operating improperly based on the determined number of detected carriers for each sector associated with the base station and an expected number of detected carriers for each sector associated with the base station.

9. The radio frequency scanner of claim 1, wherein the processor is configured to perform a carrier detection operation to determine if a carrier is detected, the carrier detection operation being based on the presence metric associated with the carrier and a metric threshold.

10. The radio frequency scanner of claim 9, wherein the processor is configured to perform the carrier detection operation a number of times for each carrier, and the processor is configured to determine the carrier is detected if at least a threshold number of carrier detection operations produces a positive detection result.

11. The radio frequency scanner of claim 1, wherein the processor is configured to generate an alarm if the processor determines the base station is operating improperly.

12. The radio frequency scanner of claim 11, wherein the processor is configured to output the alarm from the radio frequency scanner.

13. A method of monitoring a base station, comprising:
obtaining signals for transmission by the base station;
detecting a presence metric for each carrier expected in the obtained signals; and
determining, by a processor, if the base station is operating improperly based on the detected presence metrics,
wherein the determining determines a number of detected carriers based on the presence metrics, and determines whether the base station is operating improperly based on the determined number of detected carriers and an expected number of detected carriers.

14. The method of claim 13, wherein the obtaining obtains the signals from output of at least one radio frequency filter prior to transmission.

15. The method of claim 13, wherein
obtaining obtains at least one signal corresponding to each sector associated with the base station; and
the determining determines if the base station is operating improperly with respect to each sector associated with the base station.

16. The radio frequency scanner of claim 13, wherein the presence metric is one of average envelop power, peak power, and a combination of average envelope power and peak power.

17. The radio frequency scanner of claim 13, further comprising:
generating an alarm if the determining determines the base station is operating improperly.

* * * * *